(12) United States Patent
Agrawal et al.

(10) Patent No.: US 10,932,275 B2
(45) Date of Patent: Feb. 23, 2021

(54) INTELLIGENT WIRELESS CHANNEL SELECTION

(71) Applicant: Microsoft Technology Licensing, LLC, Redmond, WA (US)

(72) Inventors: Prateek Agrawal, Redmond, WA (US); Uday Sooryakant Hegde, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/943,569

(22) Filed: Apr. 2, 2018

(65) Prior Publication Data
US 2019/0306866 A1  Oct. 3, 2019

(51) Int. Cl.
*H04W 72/06* (2009.01)
*H04W 48/20* (2009.01)
(Continued)

(52) U.S. Cl.
CPC .............. *H04W 72/06* (2013.01); *H04W 8/22* (2013.01); *H04W 24/10* (2013.01); *H04W 36/30* (2013.01); *H04W 36/36* (2013.01); *H04W 48/17* (2013.01); *H04W 48/20* (2013.01); *H04W 36/08* (2013.01); *H04W 36/24* (2013.01); *H04W 84/12* (2013.01); *H04W 88/08* (2013.01)

(58) Field of Classification Search
CPC ......... H04L 47/10; H04L 47/30; H04L 47/11; H04L 47/12; H04L 12/5602; H04L 2012/5636; H04L 2012/5632; H04L 47/35; H04L 47/32; H04L 2012/5608; H04W 84/12; H04W 88/08; H04W 80/04; H04W 88/06; H04W 84/18; H04W 36/30; H04W 36/24; H04W 72/04; H04W 76/00; H04W 36/18; H04W 36/0011; H04W 36/14; H04W 52/40; H04B 7/04; H04B 7/0617
USPC .... 370/229, 232–235, 310.2, 328, 338, 332, 370/329, 331, 333, 334, 349
See application file for complete search history.

(56) References Cited

U.S. PATENT DOCUMENTS

| 8,964,595 | B2 | 2/2015 | Agarwal et al. |
| 9,131,391 | B2 | 9/2015 | Madan et al. |

(Continued)

FOREIGN PATENT DOCUMENTS

| CN | 101197740 A | 6/2008 |
| EP | 1998500 A1 | 12/2008 |

OTHER PUBLICATIONS

"International Search Report and Written Opinion Issued in PCT Application No. PCTUS19023783", dated Aug. 2, 2019, 22 Pages.

*Primary Examiner* — Brenda H Pham
(74) *Attorney, Agent, or Firm* — Ray Quinney & Nebeker, P.C.; Thomas M. Hardman; Gregg W. Wisdom (57) ABSTRACT

A client device may obtain a first measurement corresponding to a serving WLAN access point that uses a first channel. The client device may also obtain a second measurement corresponding to a target WLAN access point that uses a second channel. To facilitate intelligent wireless channel selection, the client device may weight at least one of the first measurement and the second measurement based on channel selection settings to obtain at least one weighted measurement. The client device may determine whether to roam from the serving WLAN access point to the target WLAN access point based on the at least one weighted measurement.

19 Claims, 7 Drawing Sheets

(51) Int. Cl.
*H04W 48/00* (2009.01)
*H04W 24/10* (2009.01)
*H04W 8/22* (2009.01)
*H04W 36/30* (2009.01)
*H04W 36/36* (2009.01)
*H04W 88/08* (2009.01)
*H04W 84/12* (2009.01)
*H04W 36/24* (2009.01)
*H04W 36/08* (2009.01)

(56) References Cited

U.S. PATENT DOCUMENTS

| | | |
|---|---|---|
| 9,445,345 B2 | 9/2016 | Barriac et al. |
| 9,686,688 B2 | 6/2017 | Hedayat et al. |
| 9,743,418 B1 | 8/2017 | Jupudi et al. |
| 2005/0096045 A1 | 5/2005 | Palmer et al. |
| 2005/0208950 A1* | 9/2005 | Hasse ............. H04L 47/125 455/453 |
| 2005/0282546 A1 | 12/2005 | Chang et al. |
| 2007/0160007 A1 | 7/2007 | Wang et al. |
| 2010/0080172 A1* | 4/2010 | Jin ............. H04W 60/005 370/328 |
| 2012/0170474 A1* | 7/2012 | Pekarske ............. A61B 5/002 370/252 |
| 2013/0232555 A1 | 9/2013 | Zhang et al. |
| 2014/0211686 A1 | 7/2014 | Cariou et al. |
| 2015/0133184 A1 | 5/2015 | Sadek et al. |
| 2015/0327052 A1 | 11/2015 | Ghai |
| 2016/0014793 A1 | 1/2016 | Klemp et al. |
| 2016/0081096 A1 | 3/2016 | Werner et al. |
| 2016/0135199 A1 | 5/2016 | Wang et al. |
| 2019/0208454 A1* | 7/2019 | Tang ............. H04B 17/327 |

* cited by examiner

INTELLIGENT WIRELESS CHANNEL SELECTION

CROSS-REFERENCE TO RELATED APPLICATIONS

N/A

BACKGROUND

A wireless local area network (WLAN) is a wireless computer network that links two or more devices using wireless communication within a limited area such as a home, school, computer laboratory, or office building. WLANs give users the ability to move around within a local coverage area and yet still be connected to the network. Wireless LANs have become popular for use in the home, due to their ease of installation and use. They are also popular in businesses and other types of enterprises that offer wireless access to their employees and customers.

A typical WLAN includes one or more access points. An access point may be connected directly to a wired local area network (LAN) and may provide wireless connections for other devices to use that wired connection. An access point typically supports the connection of multiple wireless client devices through its single wired connection.

Most WLANs in use today are based on the Institute of Electrical and Electronics Engineers (IEEE) 802.11 standards. Equipment that is configured to operate in accordance with one or more of the IEEE 802.11 standards is typically sold under the trademark Wi-Fi®. The IEEE 802.11 standards are directed to wireless communications within the unlicensed portion of the frequency spectrum.

There are several different IEEE 802.11 variants in use. Different IEEE 802.11 variants may use different frequency bands. For example, IEEE 802.11b was the first WLAN standard to be widely adopted, and it uses the 2.4 GHz frequency band. IEEE 802.11a, however, uses the 5 GHz band. Other frequency bands may also be used. Each frequency band is divided into multiple channels. Countries apply their own regulations to the allowable channels, allowed users, and maximum power levels within the various frequency bands.

SUMMARY

A method for intelligent wireless channel selection is disclosed. The method may be performed by a client device. The client device may obtain a first measurement corresponding to a serving WLAN access point that uses a first channel and obtain a second measurement corresponding to a target WLAN access point that uses a second channel. At least one of the first measurement and the second measurement may be weighted based on channel selection settings to obtain at least one weighted measurement. The client device may determine whether to roam from the serving WLAN access point to the target WLAN access point based on the at least one weighted measurement.

The first measurement may include a first signal strength measurement and the second measurement may include a second signal strength measurement. Alternatively, the first measurement may include a first signal quality measurement and the second measurement may include a second signal quality measurement. In some implementations, the first measurement and the second measurement may include both signal strength and signal quality measurements.

The client device may determine channel selection settings prior to obtaining the first measurement or the second measurement. The channel selection settings may be at least partially based on device-specific characteristics of the client device. In some implementations, the client device may obtain performance metrics indicating performance of the client device over time. The channel selection settings may be dynamically updated based on the performance metrics.

The channel selection settings may include one or more weights to be applied to edge channels that correspond to an edge of a frequency range over which an antenna of the client device is designed to operate. The channel selection settings may include one or more weights to be applied to channels that are required to use Dynamic Frequency Selection (DFS). The channel selection settings may include one or more weights to be applied to channels that overlap with Long Term Evolution (LTE) channels. The channel selection settings may be at least partially user configurable, and the client device may receive user input specifying at least some of the channel selection settings.

A client device configured for intelligent wireless channel selection is also disclosed. The client device includes a WLAN interface, a processor, and memory in electronic communication with the processor. Channel selection settings may be stored in the memory. Instructions may also be stored in the memory. The instructions may be executable by the processor to obtain a first measurement corresponding to a serving WLAN access point that uses a first channel and obtain a second measurement corresponding to a target WLAN access point that uses a second channel. The instructions may also be executable by the processor to weight at least one of the first measurement and the second measurement based on channel selection settings to obtain at least one weighted measurement, and to determine whether to roam from the serving WLAN access point to the target WLAN access point based on the at least one weighted measurement.

An access point configured to facilitate intelligent wireless channel selection is also disclosed. The access point includes a WLAN interface, a processor, and memory in electronic communication with the processor. Performance metrics may be stored in the memory. The performance metrics may indicate performance of a plurality of different device types on a channel used by the access point. Instructions may also be stored in the memory. The instructions may be executable by the processor to receive a roaming request from a client device, determine a device type associated with the client device, and deny the roaming request based on the performance metrics associated with the device type.

DETAILED DESCRIPTION

A WLAN may include multiple access points. Roaming occurs when a client device moves from the coverage area of one access point to the coverage area of another access point. In this context, the term "roaming" refers to the process of transferring a wireless connection from one access point to another. The access point that is currently serving the client device may be referred to as the "serving" access point. Roaming may occur from the serving access point to a "target" access point.

Within a WLAN, communication between a client device and an access point occurs on a particular wireless channel. Different access points within the same WLAN use different channels. Thus, when roaming occurs from one access point to another, the client device may switch from one channel to another.

The decision about whether to transfer a wireless connection from one access point to another may be based on signal strength measurements. For example, a client device may obtain signal strength measurements from a serving access point and a target access point. If the signal strength measurement from the target access point is more favorable than the signal strength measurement from the serving access point, the client device may decide to transfer its wireless connection from the serving access point to the target access point. Alternatively, the decision about whether to roam from the serving access point to the target access point may be based on signal quality measurements instead of signal strength measurements. In some implementations, both signal strength measurements and signal quality measurements may be taken into consideration when making a decision about roaming.

There may be many other factors besides signal strength and signal quality that are relevant to roaming decisions. At least some of these factors may be based on particular characteristics of the client device. For example, suppose that the channel used by the target access point is an edge channel, i.e., a channel that corresponds to an edge of the frequency range over which the client device's antenna is designed to operate. Some antennas may not have optimal performance when they are used to transmit and receive signals on an edge channel. Thus, if the channel used by the target access point is an edge channel, the client device may experience degraded performance if it roams to the target access point.

Currently known approaches to roaming in a WLAN, however, tend to focus solely or primarily on signal strength and/or quality, and generally do not consider other factors when making decisions about roaming. Known approaches do not take factors related to device-specific characteristics into consideration when roaming decisions are being made.

The present disclosure is generally related to facilitating intelligent wireless channel selection, so that factors other than signal strength and signal quality may be taken into consideration when decisions about roaming are being made. In accordance with the present disclosure, measurements (e.g., signal strength measurements, signal quality measurements) may be weighted based on one or more factors that are relevant to decisions about roaming. These factors may be at least partially based on device-specific characteristics of the client device. For example, if the channel used by the target access point is an edge channel, a signal strength measurement corresponding to the target access point may be weighted so that the client device does not roam to the target access point until the target access point's weighted signal strength measurement greatly exceeds the serving access point's weighted signal strength measurement.

Advantageously, the weights that are applied to particular channels may be determined in advance, so as to minimize the amount of processing that is performed when roaming decisions are being made.

Figure 1A:
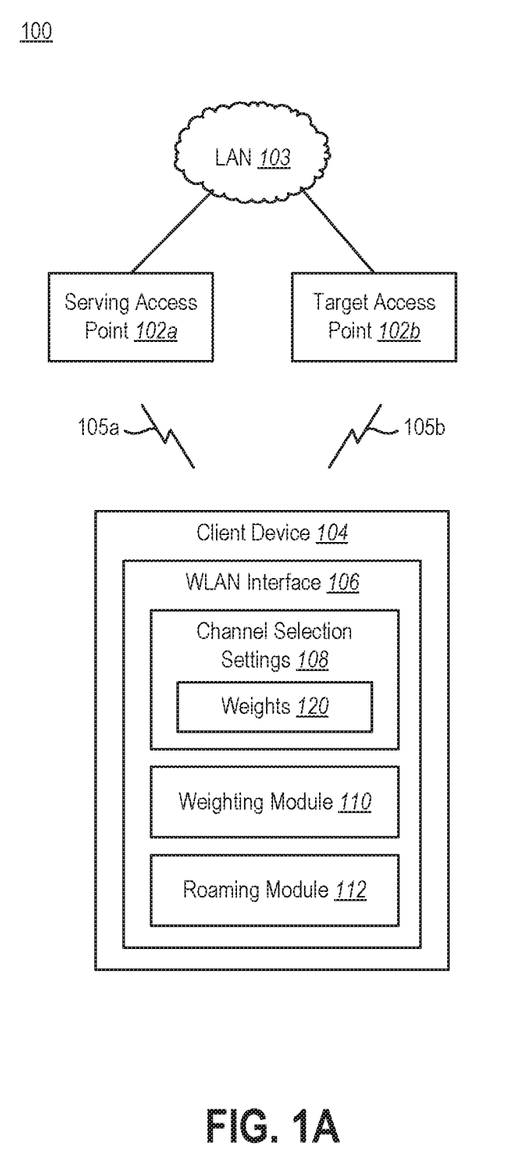
FIGS. 1A-B illustrate an example of a system for intelligent wireless channel selection in accordance with the present disclosure.
Figure 1B:
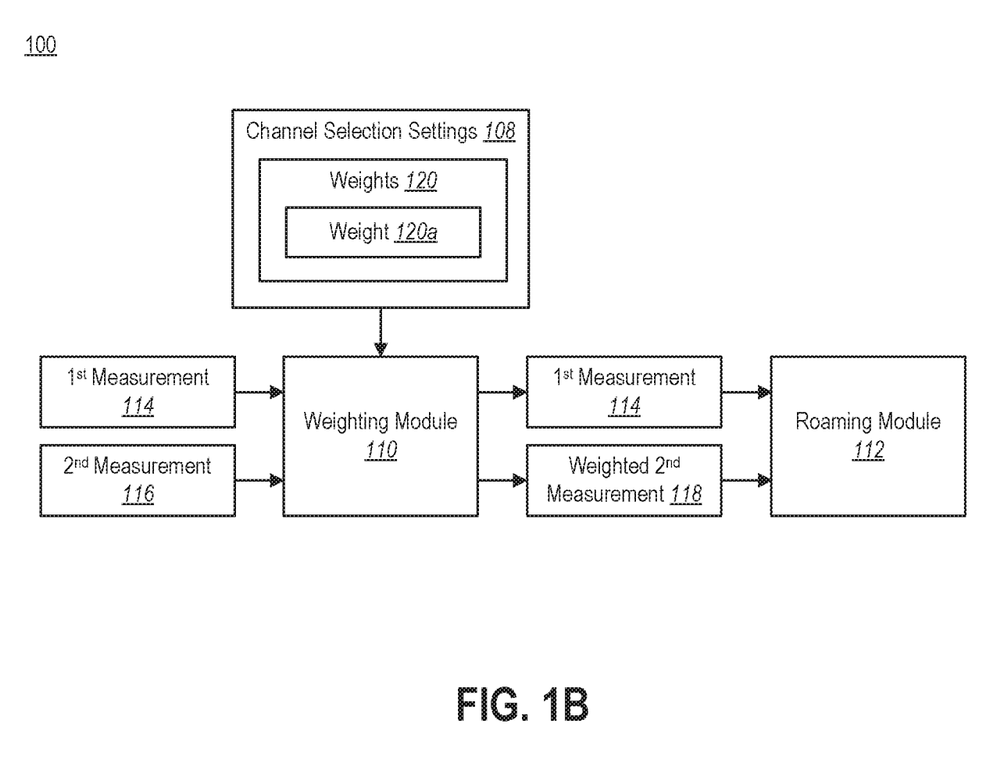

FIGS. 1A-B illustrate an example of a system 100 for intelligent wireless channel selection in accordance with the present disclosure. Referring initially to FIG. 1A, a serving WLAN access point 102a provides a wireless connection for a client device 104 to use a wired connection to a LAN 103. The client device 104 may be a mobile computing device such as a laptop computer, tablet computer, smartphone, virtual reality headset, or the like. Wireless communication between the client device 104 and the serving WLAN access point 102a may occur via a first channel 105a. The serving WLAN access point 102a may be referred to herein simply as a serving access point 102a.

The client device 104 includes a WLAN interface 106 that facilitates wireless communication with other devices. The client device 104 communicates with the serving WLAN access point 102a via the WLAN interface 106. The WLAN interface 106 may include software components, such as a WLAN driver as well as some components of an operating system of the client device 104. The WLAN interface 106 may also utilize hardware components, such as a transceiver and an antenna, that facilitate wireless communication.

At some point, the client device 104 may begin to move away from the coverage area of the serving access point 102a and toward the coverage area of a target WLAN access point 102b. The target WLAN access point 102b may be referred to herein simply as a target access point 102b. The WLAN interface 106 includes a roaming module 112, which may be configured to determine whether the client device 104 should roam from the serving access point 102a to the target access point 102b.

As part of making decisions about roaming, measurements (e.g., signal strength measurements, signal quality measurements) corresponding to both the serving access point 102a and the target access point 102b may be obtained. Decisions about roaming may be based at least partially on these measurements.

To enhance the decision-making process, the client device 104 may include channel selection settings 108 and a weighting module 110. The channel selection settings 108 may include one or more weights 120 to be applied to the measurements made by the client device 104. For example, the channel selection settings 108 may include one or more weights 120 corresponding to the channel 105a that is used by the serving access point 102a, as well as one or more weights 120 corresponding to the channel 105b that is used by the target access point 102b. The weight(s) 120 associated with a particular channel 105a-b may be designed to compensate for one or more characteristics of that channel 105a-b that affect the quality of wireless communication experienced by the client device 104. As will be discussed in greater detail below, at least some of the weights 120 in the channel selection settings 108 may depend on device-specific characteristics of the client device 104. For example, if the channel 105b used by the target access point 102b is an edge channel, the channel selection settings 108 may include one or more weights 120 that account for this characteristic.

The channel selection settings 108 may be determined before the measurements corresponding to the serving access point 102a and the target access point 102b are obtained. In some implementations, the channel selection settings 108 may be determined as part of an initial configuration of the client device 104. For example, the channel selection settings 108 may be determined when the client device 104 is initially manufactured, when wireless networking software (e.g., a WLAN driver) is initially installed on the client device 104, or at another point in time before the client device 104 connects to a WLAN and begins making decisions about roaming.

Alternatively, the channel selection settings 108 corresponding to particular channels 105a-b may reflect the average performance of those channels 105a-b over a period of time. In some implementations, some of the channel selection settings 108 may be determined before channel measurements are made (e.g., as part of an initial configuration of the client device 104), while other channel selection settings 108 may be determined at a later point in time and may reflect the average performance of certain channels 105a-b as determined through channel measurements.

Reference is now made to FIG. 1B, which illustrates an example showing how the channel selection settings 108 may be used to facilitate intelligent wireless channel selection. At some point when the client device 104 is moving away from the coverage area of the serving access point 102a and toward the coverage area of the target access point 102b, the client device 104 may obtain a first measurement 114 corresponding to the serving access point 102a and a second measurement 116 corresponding to the target access point 102b. The measurements 114, 116 may be, for example, signal strength measurements, signal quality measurements, or other types of measurements that indicate the desirability of moving from the serving access point 102a to the target access point 102b.

Suppose for purposes of this example that the weights 120 within the channel selection settings 108 include a weight 120a for the channel 105b that is being used by the target access point 102b, but do not include any weights 120 for the channel 105a that is being used by the serving access point 102a. In this case, the weighting module 110 may apply the weight 120a to the second measurement 116 corresponding to the target access point 102b, thereby obtaining a weighted second measurement 118. The roaming module 112 may then use the first measurement 114 and the weighted second measurement 118 to determine whether to roam from the serving access point 102a to the target access point 102b. In other words, instead of comparing the first measurement 114 with the second measurement 116, the roaming module 112 may compare the first measurement 114 with the weighted second measurement 118.

For example, suppose that the client device 104 measures a signal strength of 90 from the serving access point 102a and a signal strength of 100 from the target access point 102b. (A signal strength measurement may be an average signal strength measured over a period of time. Also, for purposes of this example, it will be assumed that the signal strength is being measured in terms of a Received Signal Strength Indicator (RSSI), which is a relative index.) If these signal strengths are compared without any weights being applied, the client device 104 may determine that it should roam to the target access point 102b because the signal strength measured from the target access point 102b (100) exceeds the signal strength measured from the serving access point 102a (90). Suppose, however, that the channel selection settings 108 include a weight 120a of 0.8 for the channel 105b that is being used by the target access point 102b. In this case, the signal strength of 90 from the serving access point 102a may be compared with a weighted signal strength of 80 (100×0.8) from the target access point 102b. Based on this comparison, the client device 104 may determine that it should not roam to the target access point 102b.

If the client device 104 continues to move away from the serving access point 102a and toward the target access point 102b, the client device 104 may eventually decide to roam to the target access point 102b, even when taking the weight 120a for the channel 105b that is being used by the target access point 102b into consideration. Suppose, for example, there comes a point at which the client device 104 measures a signal strength of 80 from the serving access point 102a and a signal strength of 110 from the target access point 102b. In this case, the signal strength of 80 from the serving access point 102a may be compared with a weighted signal strength of 88 (110×0.8) from the target access point 102b. Based on this comparison, the client device 104 may determine that it should roam to the target access point 102b. Thus, the weight 120a for the channel 105b that is being used by the target access point 102b may be set so that it does not prevent roaming from occurring, but simply delays roaming until the difference between the relative signal strengths (or other measurements) is sufficient to overcome whatever disadvantages are associated with that channel 105b.

Of course, the details of the above example should not be interpreted as limiting the scope of the present disclosure. For instance, in some implementations, the channel selection settings 108 may include one or more weights 120 for both the serving access point 102a and the target access point 102b. Alternatively, the channel selection settings 108 may include one or more weights 120 for the serving access point 102a, but may not include any weights 120 for the target access point 102b. Also, instead of RSSI, signal strength may be measured in terms of another unit of measurement, such as dBM (decibels relative to a milliwatt). Furthermore, roaming decisions may be based on another type of measurement (e.g., signal quality) instead of or in addition to signal strength.

Figure 2:
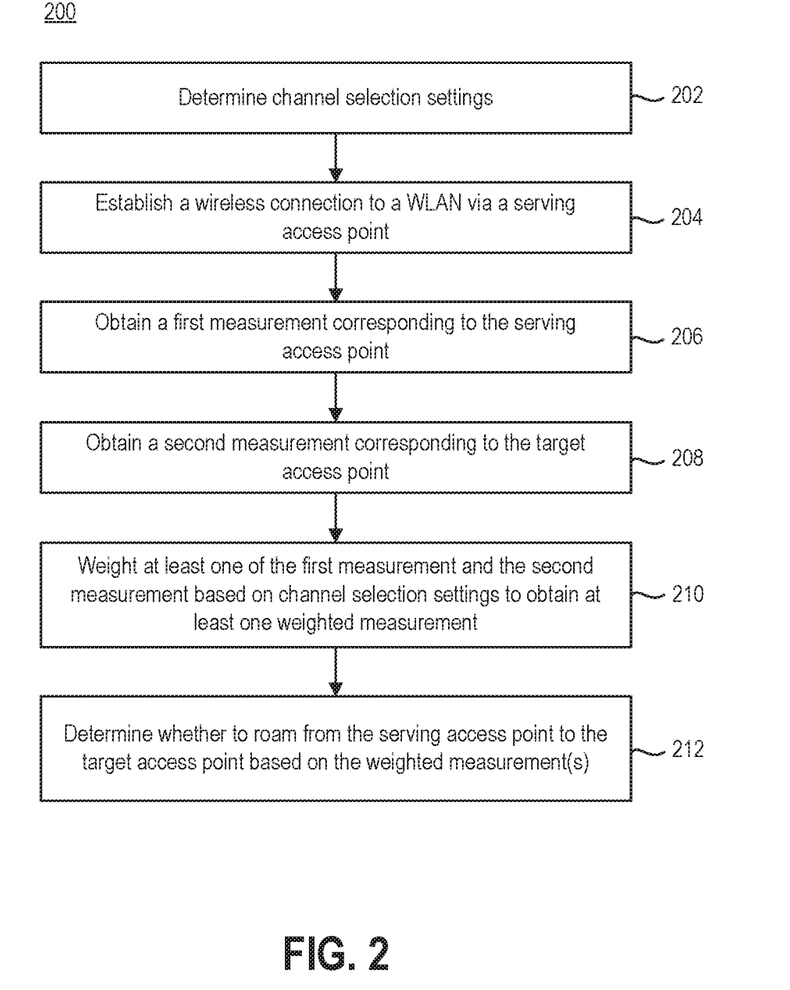
FIG. 2 illustrates a method that may be implemented by a client device to facilitate intelligent wireless channel selection in accordance with the present disclosure.

FIG. 2 illustrates a method 200 that may be implemented by a client device 104 to facilitate intelligent wireless channel selection in accordance with the present disclosure. The method 200 will be discussed in relation to the system 100 shown in FIGS. 1A-B.

The method 200 includes determining 202 channel selection settings 108. The channel selection settings 108 may be determined 202 as part of an initial configuration of the client device 104. At some point in time after the channel selection settings 108 are determined 202, the client device 104 may establish 204 a wireless connection to a WLAN via a serving access point 102a.

When the client device 104 begins to move away from the coverage area of the serving access point 102a and toward the coverage area of a target WLAN access point 102b, the client device 104 may begin to obtain measurements (e.g., signal strength measurements, signal quality measurements) corresponding to both the serving access point 102a and a target access point 102b. In particular, the client device 104 may obtain 206 a first measurement 114 corresponding to the serving access point 102a. The client device 104 may also obtain 208 a second measurement 116 corresponding to the target access point 102b. The first measurement 114 and the second measurement 116 may be the average of several measurements taken over a period of time.

One or more characteristics of the channel 105a used by the serving access point 102a and/or the channel 105b used by the target access point 102b may affect the quality of wireless communication experienced by the client device 104. To compensate for these characteristics, the client device 104 may weight 210 at least one of the first measurement 114 and the second measurement 116 based on channel selection settings 108, thereby obtaining at least one weighted measurement 118. In the example discussed above in connection with FIG. 1B, a weight 120a is applied to the second measurement 116 corresponding to the target access point 102b to obtain a weighted second measurement 118. Alternatively, one or more weights 120 may be applied to the first measurement 114 corresponding to the serving access point 102a, or to both measurements 114, 116.

The client device 104 may use the weighted measurement(s) to determine 212 whether it should roam from the serving access point 102a to the target access point 102b. In the example discussed above in connection with FIG. 1B, the client device 104 compares the first measurement 114 to the weighted second measurement 118. If the weighted second measurement 118 exceeds the first measurement 114 by a sufficient amount (e.g., a defined threshold), the client device 104 may determine that it should roam to the target access point 102b.

Figure 3:
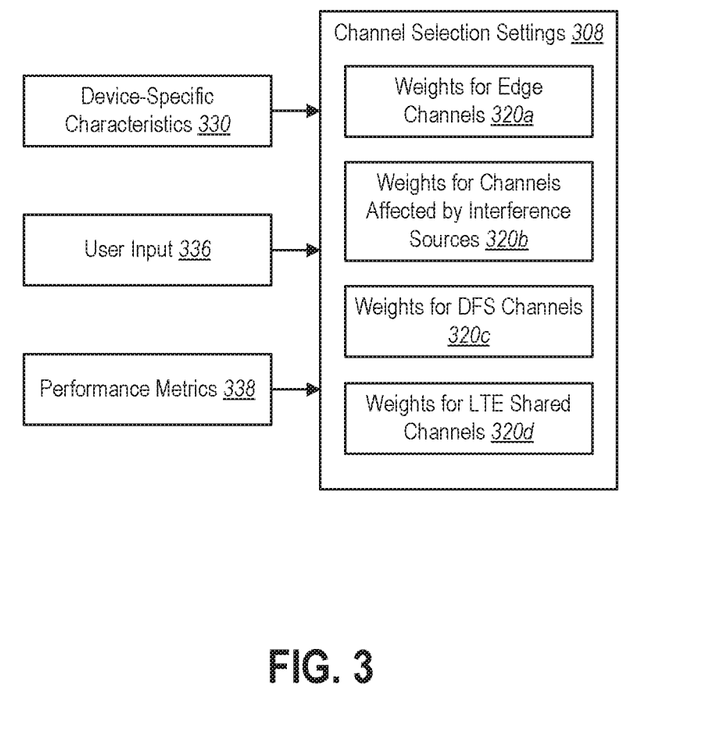
FIG. 3 illustrates examples of different types of channel selection settings, as well as examples of various factors that may be used to determine channel selection settings.

FIG. 3 illustrates examples of different types of channel selection settings 308, as well as examples of various factors that may be used to determine channel selection settings 308. As discussed above, the channel selection settings 308 may be based at least in part on device-specific characteristics 330 of the client device 104. For example, the channel selection settings 308 may include one or more weights 320a for edge channels if an antenna of the client device 104 has suboptimal performance on the edge channels. As another example, the channel selection settings 308 may include one or more weights 320b for channels that are affected by interference sources within the client device 104.

The channel selection settings 308 may also include one or more weights 320c for channels that are required to comply with dynamic frequency selection (DFS) requirements. In many countries, regulatory requirements may place restrictions on certain channels because the frequency spectrum used by those channels is shared with other technologies and services. DFS is a mandate for WLANs that utilize those channels to avoid other radio transmissions that are considered primary-use or mission-critical. These primary-use or mission-critical devices may include various types of radar systems used by specific industrial, federal civilian, and military organizations. When WLANs use DFS channels, there is a possibility that wireless communications may be interrupted.

The channel selection settings 308 may also include one or more weights 320d for channels that share frequency spectrum with Long Term Evolution (LTE) channels. LTE is a standard developed by the 3GPP (3$^{rd}$ Generation Partnership Project) for high-speed wireless communication via cellular networks. The commercial success of LTE and the resulting growth in mobile data demand have caused cellular network operators to offload some of their data traffic by accessing unlicensed frequency spectrum, including some frequencies commonly used by WLANs. Currently, there are several different variants of LTE operating in the unlicensed band, including LTE-Unlicensed (or LTE-U), Licensed Spectrum Access (LAA), and MulteFire.

If a client device 104 uses any of these types of channels (edge channels, channels that are affected by interference sources within the client device 104, channels that are required to use DFS, or channels that overlap with LTE channels) to communicate with an access point, a client device 104 may experience degraded performance. Thus, providing channel selection settings 308 that include one or more weights 320a for edge channels, one or more weights 320b for channels affected by interference sources within the client device 104, one or more weights 320c for channels that are required to use DFS, and one or more weights 320d for channels that overlap with LTE channels may enable a client device 104 to make better decisions about roaming.

As indicated above, the channel selection settings 308 may be determined as part of an initial configuration of the client device 104. The channel selection settings 308 may be at least partially user configurable. Thus, at least some of the channel selection settings 308 may be specified via user input 336.

The channel selection settings 308 may also be updated over time. For example, the client device 104 may keep track of performance metrics 338 that indicate how well the client device 104 performs on different channels over time. These performance metrics 338 may be used to dynamically update the channel selection settings 308.

Figure 4:
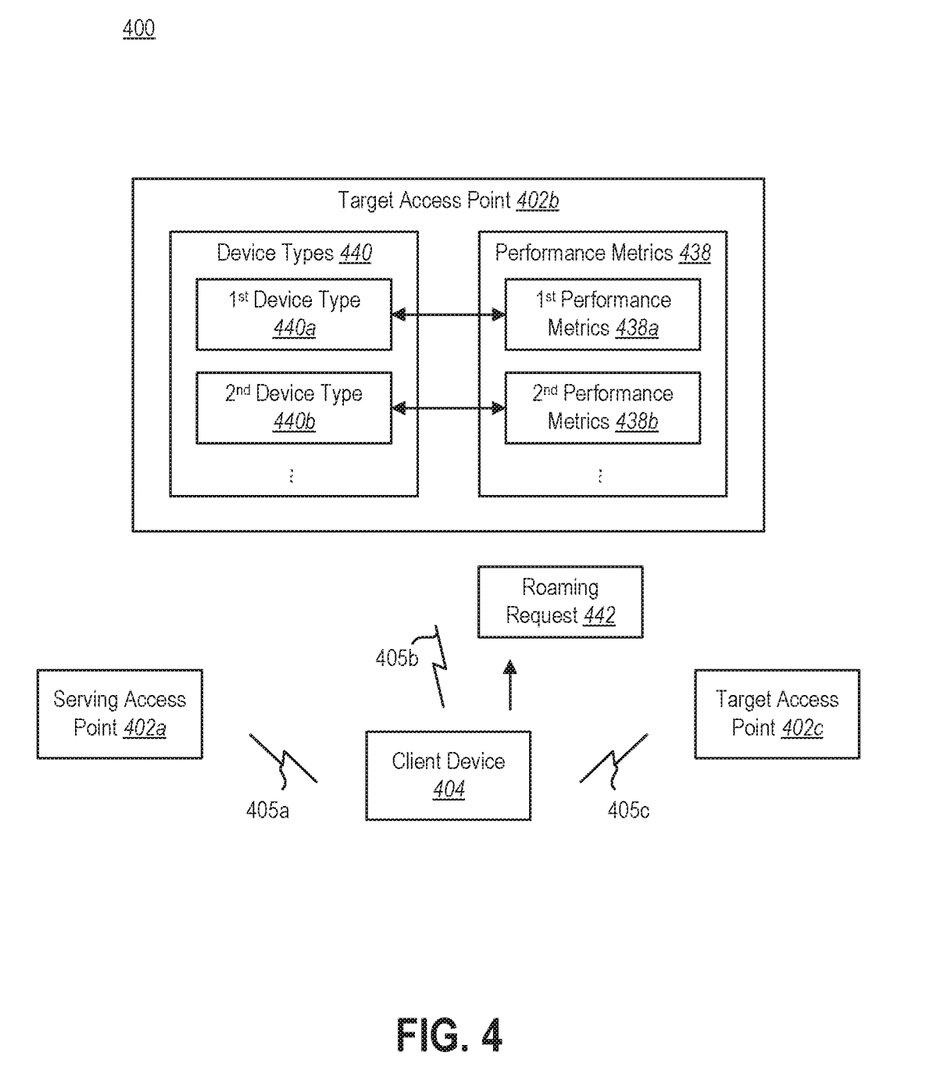
FIG. 4 illustrates another example of a system for intelligent wireless channel selection in accordance with the present disclosure.

FIG. 4 illustrates another example of a system 400 for intelligent wireless channel selection in accordance with the present disclosure. In the system 100 shown in FIGS. 1A-B, the client device 104 considers factors other than signal strength and signal quality when it makes a decision about roaming. In the system 400 shown in FIG. 4, similar functionality is provided by a target access point 402b.

The system 400 includes a client device 404 receiving service from a serving access point 402a via a first channel 405a. At some point, the client device 404 may move away from the coverage area of the serving access point 402a to the coverage area of a target access point 402b.

The target access point 402b may be configured to keep track of performance metrics 438 that indicate performance of different device types 440 on a channel 405b used by the target access point 402b. For example, the performance metrics 438 may include first performance metrics 438a that provide information about the performance of devices of a first device type 440a on the channel 405b, second performance metrics 438b that provide information about the performance of devices of a second device type 440b on the channel 405b, and so forth.

The different device types 440 may be different categories of devices. For example, a first device type 440a may be laptop computers, a second device type 440b may be smartphones, and so forth. In some implementations, particular categories of devices may be further divided into various sub-categories. For example, the category of laptop computers may be further divided into sub-categories that are based on manufacturer. In such an implementation, a first device type 440a may be laptop computers made by a first manufacturer, a second device type 440b may be laptop computers made by a second manufacturer, and so forth.

At some point, the client device 404 may determine that it should roam from the serving access point 402a to the target access point 402b. In response to making this determination, the client device 404 may send a roaming request 442 to the target access point 402b.

When the target access point 402b receives the roaming request 442, the target access point 402b may use information in the roaming request 442 to identify the device type 440 that is associated with the client device 404. The target access point 402b may then determine whether the roaming request 442 should be granted or denied based on the performance metrics 438 that are associated with the device type 440. For example, if the client device 404 is associated with a first device type 440a, the target access point 402b may evaluate first performance metrics 438a to determine whether to grant or deny the roaming request 442. If the target access point 402b denies the roaming request 442, the target access point 402b may redirect the client device 404 to another target access point 402c that is in the same geographical area and that may provide more favorable performance to the client device 404 via another channel 405c.

Figure 5:
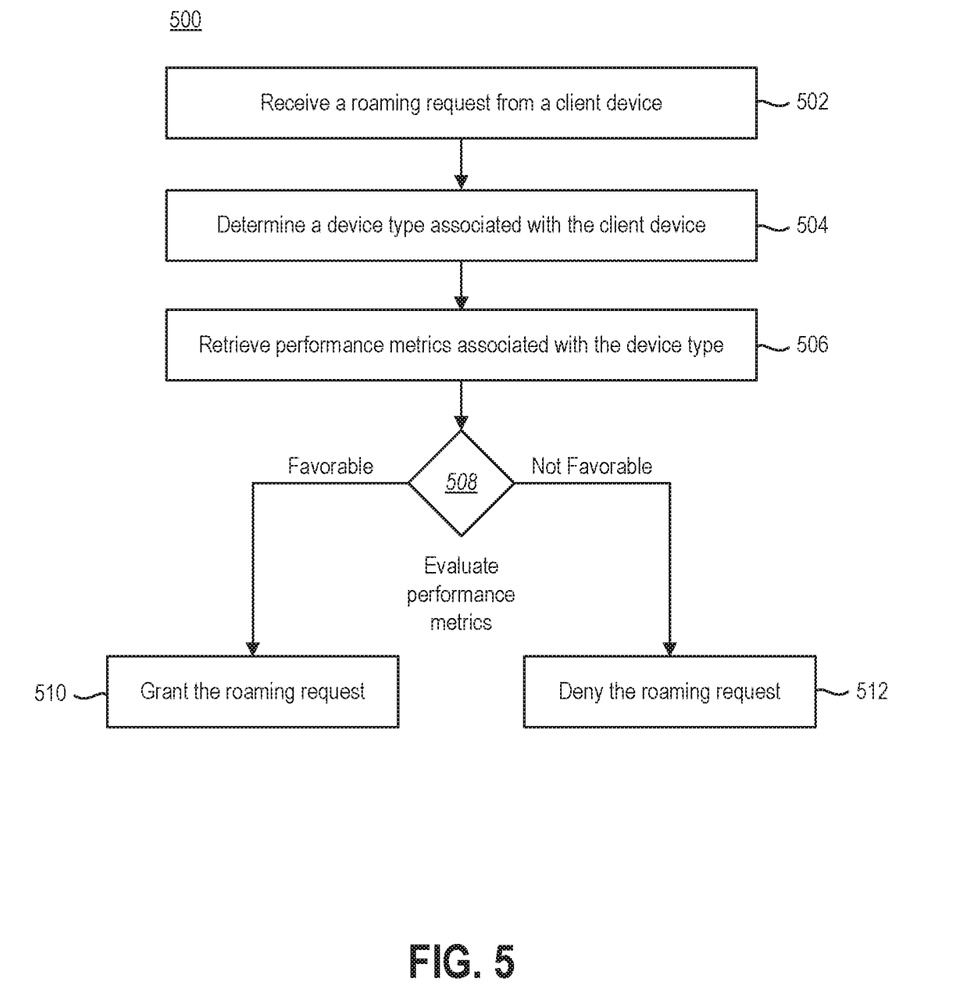
FIG. 5 illustrates a method that may be implemented by a target access point to facilitate intelligent wireless channel selection in accordance with the present disclosure.

FIG. 5 illustrates a method 500 that may be implemented by a target access point 402b to facilitate intelligent wireless channel selection in accordance with the present disclosure. The method 500 will be discussed in relation to the system 400 shown in FIG. 4.

In accordance with the method 500, a target access point 402b may receive 502 a roaming request 442 from a client device 404. The target access point 402b may use information in the roaming request 442 to determine 504 a device type 440 that is associated with the client device 404 and to retrieve 506 performance metrics 438 associated with the device type 440. The performance metrics 438 may be evaluated 508 in order to determine whether to grant or deny the roaming request 442. If the performance metrics 438 are favorable, the target access point 402b may grant 510 the roaming request 442. If, however, the performance metrics 438 are not favorable, the target access point 402b may deny 512 the roaming request 442.

Figure 6:
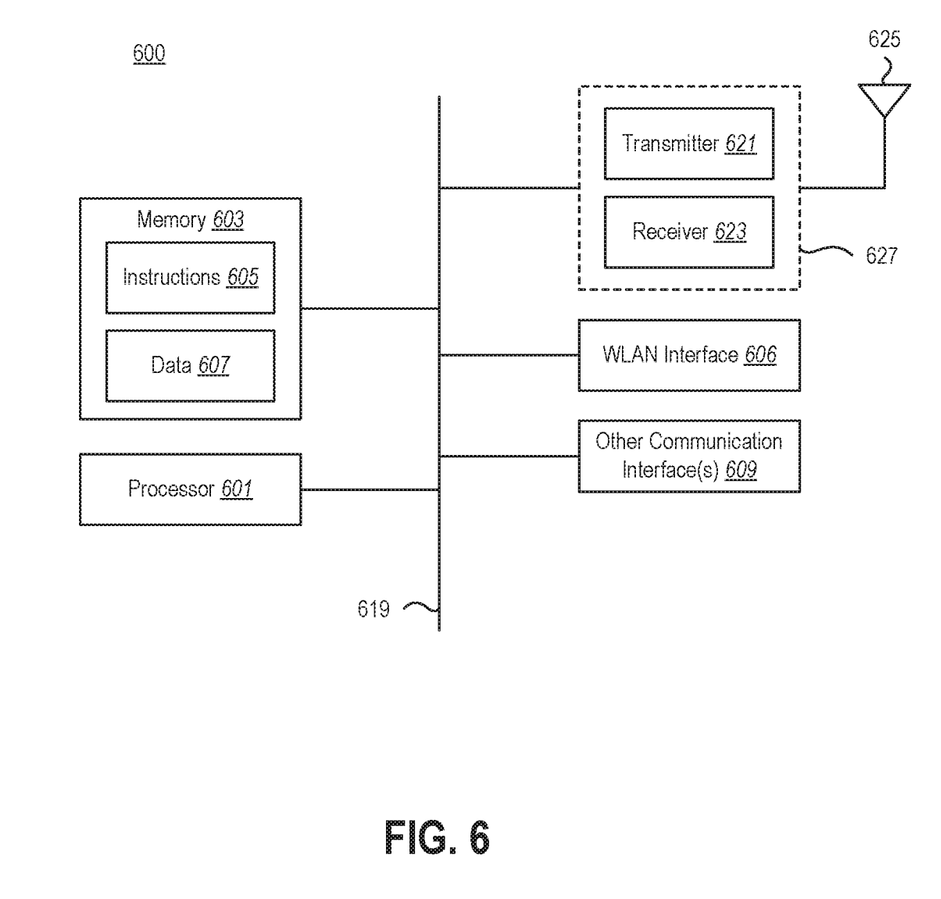
FIG. 6 illustrates certain components that may be included in a wireless communication device.

FIG. 6 illustrates certain components that may be included in a wireless communication device 600. Any of the client devices 104, 404 or access points 102a-b, 402a-c described herein may be implemented with some or all of the components shown in the wireless communication device 600.

The wireless communication device 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the wireless communication device 600 of FIG. 6, in an alternative configuration, a combination of processors (e.g., an ARM and DSP) could be used.

The wireless communication device 600 also includes memory 603. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality that has been described herein with respect to the client devices 104, 404 or access points 102a-b, 402a-c. For example, the instructions 605 may be executable by the processor 601 to perform some or all of the operations described above in connection with the methods 200, 500 shown in FIGS. 2 and 5. Any of the various examples of modules and components described herein (e.g., the weighting module 110, the roaming module 112) may be implemented, partially or wholly, as instructions 605 stored in memory 603 and executed by the processor 601.

Executing the instructions 605 may involve the use of the data 607 that is stored in the memory 603. Any of the various examples of data described herein may be among the data 607 that is stored in memory 603 and used during execution of the instructions 605 by the processor 601. Some examples of data 607 that may be stored in the memory 603 and used in connection with executing the instructions 605 include channel selection settings 108, 308, measurements 114, 116, weighted measurements 118, user input 336, performance metrics 338, 438, and information about device types 440.

The wireless communication device 600 may also include a WLAN interface 606 that is configured to facilitate wireless communications with one or more other devices. In some implementations, the WLAN interface may operate in accordance with an IEEE 802.11 standard. The WLAN interface 606 may utilize a transmitter 621 and a receiver 623 to facilitate wireless transmission and reception of signals to and from the wireless communication device 600 via an antenna 625. The transmitter 621 and receiver 623 may be collectively referred to as a transceiver 627. In some embodiments, the wireless communication device 600 may include (not shown) multiple transmitters, multiple antennas, multiple receivers and/or multiple transceivers.

The wireless communication device 600 may also include one or more other communication interfaces 609, at least some of which may be based on wired communication technology. For example, the one or more other communication interfaces 609 may include a Universal Serial Bus (USB) and/or an Ethernet adapter.

The various components of the wireless communication device 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for intelligent wireless channel selection, the method being performed by a client device, the method comprising:
    obtaining a first measurement corresponding to a serving wireless local area network (WLAN) access point that uses a first channel;
    obtaining a second measurement corresponding to a target WLAN access point that uses a second channel, wherein a comparison of the first measurement and the second measurement indicates a first decision about whether the client device should roam from the serving WLAN access point to the target WLAN access point;
    selecting a weight from two or more weights included in channel selection settings, wherein the weight selected is based on one or more characteristics of the client device, the first channel, or the second channel;
    applying the weight to at least one of the first measurement and the second measurement to obtain at least one weighted measurement; and
    determining whether to roam from the serving WLAN access point to the target WLAN access point based on the at least one weighted measurement, wherein the at least one weighted measurement indicates a second decision about whether the client device should roam from the serving WLAN access point to the target WLAN access point, the second decision being different from the first decision.

2. The method of claim 1, wherein:
    the first measurement comprises a first signal strength measurement; and
    the second measurement comprises a second signal strength measurement.

3. The method of claim 1, wherein:
    the first measurement comprises a first signal quality measurement; and
    the second measurement comprises a second signal quality measurement.

4. The method of claim 1, further comprising determining the channel selection settings, wherein the channel selection settings are determined prior to obtaining the first measurement or the second measurement.

5. The method of claim 1, wherein the channel selection settings are at least partially based on device-specific characteristics of the client device.

6. The method of claim 1, wherein the channel selection settings comprise one or more weights to be applied to edge channels that correspond to an edge of a frequency range over which an antenna of the client device is designed to operate.

7. The method of claim 1, wherein the channel selection settings comprise one or more weights to be applied to channels that are required to use Dynamic Frequency Selection (DFS).

8. The method of claim 1, wherein the channel selection settings comprise one or more weights to be applied to channels that overlap with Long Term Evolution (LTE) channels.

9. The method of claim 1, wherein the channel selection settings are at least partially user configurable, and further comprising receiving user input specifying at least some of the channel selection settings.

10. The method of claim 1, further comprising:
    obtaining performance metrics indicating performance of the client device over time; and
    dynamically updating the channel selection settings based on the performance metrics.

11. A client device configured for intelligent wireless channel selection, comprising:
    a wireless local area network (WLAN) interface;
    a processor;
    memory in electronic communication with the processor;
    channel selection settings stored in the memory, wherein the channel selection settings comprise weights associated with different types of channels used by the client device; and
    instructions stored in the memory, the instructions being executable by the processor to:
        obtain a first measurement corresponding to a serving wireless local area network (WLAN) access point that uses a first channel;
        obtain a second measurement corresponding to a target WLAN access point that uses a second channel, wherein a comparison of the first measurement and the second measurement indicates a first decision about whether the client device should roam from the serving WLAN access point to the target WLAN access point;
        apply a weight associated with a type of channel of the first channel or the second channel to at least one of the first measurement and the second measurement based on channel selection settings to obtain at least one weighted measurement, wherein the type of channel is one of an edge channel that corresponds to an edge of a frequency range over which an antenna of the client device is designed to operate, an avoidance channel required to use Dynamic Frequency Selection (DFS), or an overlap channel that overlaps with a Long Term Evolution (LTE) channel; and
        determine whether to roam from the serving WLAN access point to the target WLAN access point based on the at least one weighted measurement, wherein the at least one weighted measurement indicates a second decision about whether the client device should roam from the serving WLAN access point to the target WLAN access point, the second decision being different from the first decision.

12. The client device of claim 11, wherein:
the first measurement comprises at least one of a first signal strength measurement and a first signal quality measurement; and
the second measurement comprises at least one of a second signal strength measurement and a second signal quality measurement.

13. The client device of claim 11, wherein:
the instructions are also executable to determine the channel selection settings; and
the channel selection settings are determined prior to obtaining the first measurement or the second measurement.

14. The client device of claim 11, wherein the channel selection settings are at least partially based on device-specific characteristics of the client device.

15. The client device of claim 11, wherein the channel selection settings comprise one or more weights to be applied to edge channels that correspond to the edge of a frequency range over which the antenna is designed to operate.

16. The client device of claim 11, wherein the channel selection settings comprise one or more weights to be applied to channels that are required to use Dynamic Frequency Selection (DFS).

17. The client device of claim 11, wherein the channel selection settings comprise one or more weights to be applied to channels that overlap with Long Term Evolution (LTE) channels.

18. The client device of claim 11, wherein:
the channel selection settings are at least partially user configurable; and
the instructions are also executable to receive user input specifying at least some of the channel selection settings.

19. The client device of claim 11, wherein the instructions are also executable to:
obtain performance metrics indicating performance of the client device over time; and
dynamically update the channel selection settings based on the performance metrics.

* * * * *